(12) United States Patent  
Kashimoto

(10) Patent No.: US 7,006,167 B2
(45) Date of Patent: Feb. 28, 2006

(54) FIXING STRUCTURE FOR AN LCD PANEL

(75) Inventor: Yoshihisa Kashimoto, Gunma (JP)

(73) Assignee: NEC Corporation, Tokyo (JP)

( * ) Notice: Subject to any disclaimer, the term of this patent is extended or adjusted under 35 U.S.C. 154(b) by 634 days.

(21) Appl. No.: 09/865,509

(22) Filed: May 29, 2001

(65) Prior Publication Data

US 2002/0015118 A1    Feb. 7, 2002

(30) Foreign Application Priority Data

May 26, 2000    (JP)    ............................. 2000-157353

(51) Int. Cl.
*G02F 1/1333*    (2006.01)

(52) U.S. Cl. .............................. 349/58; 349/59; 349/60; 349/65; 349/84; 349/150; 349/151

(58) Field of Classification Search .................. 349/58, 349/149, 150, 151, 152, 59, 96, 60, 65, 84, 349/67, 62, 70; 345/102; 361/681, 682, 361/683

See application file for complete search history.

(56) References Cited

U.S. PATENT DOCUMENTS

| 5,150,231 A | * | 9/1992 | Iwamoto et al. ................ 359/4 |
| 5,334,993 A | * | 8/1994 | Okajima et al. ............ 345/102 |
| 5,710,607 A | * | 1/1998 | Iwamoto et al. ............ 349/660 |
| 5,791,913 A | * | 8/1998 | Kajiwara ..................... 439/67 |
| 5,801,542 A | * | 9/1998 | Kajiwara et al. ............ 324/755 |
| 5,842,761 A | * | 12/1998 | Futakami et al. ............ 353/119 |
| 6,137,548 A | * | 10/2000 | Uchida et al. ............... 348/818 |
| 6,229,695 B1 | * | 5/2001 | Moon ......................... 361/683 |
| 6,330,148 B1 | * | 12/2001 | Won et al. ................... 361/681 |
| 6,342,932 B1 | * | 1/2002 | Terao et al. .................. 349/58 |
| 6,342,933 B1 | * | 1/2002 | Nakamura et al. ........... 349/58 |
| 6,504,586 B1 | * | 1/2003 | Lee ............................. 349/58 |

FOREIGN PATENT DOCUMENTS

| JP | 2-93425 | 4/1990 |
| JP | 4-28621 | 3/1992 |
| JP | 4-220624 | 8/1992 |
| JP | 5-93901 | 4/1993 |
| JP | 7-28410 | 1/1995 |
| JP | 7-99394 | 4/1995 |
| JP | 9-21839 | 1/1997 |
| JP | 9-114391 | 5/1997 |
| JP | 11-126033 | 5/1997 |
| JP | 9-146113 | 6/1997 |
| JP | 9-315487 | 12/1997 |
| JP | 10-70380 | 3/1998 |

\* cited by examiner

*Primary Examiner*—Nathan J. Flynn
*Assistant Examiner*—Fazli Erdem
(74) *Attorney, Agent, or Firm*—Foley & Lardner LLP

(57) ABSTRACT

An LCD panel fixing structure for fixing and holding an LCD panel has a first holding member, which holds the LCD panel and a second holding member, which holds the LCD panel, the LCD panel being housed, fixed, and held between the first and second holding members, thereby increasing the degree of design freedom.

7 Claims, 2 Drawing Sheets

FIXING STRUCTURE FOR AN LCD PANEL

BACKGROUND OF THE INVENTION

1. Field of the Invention

The present invention relates to a structure for fixing an LCD (liquid-crystal display) panel, and more particularly to a fixing structure for a LCD panel and a holding member of an apparatus such as an LCD monitor, a notebook-type personal computer, an all-in-one desktop personal computer, or other apparatus in which an LCD panel is fixed and used.

2. Related Art

In the past, this type of LCD panel fixing structure usually used tapped holes provided on a panel frame, with screws used to hold the LCD panel.

For example, in the Japanese unexamined patent publication No.5-93901, there is disclosure of technology whereby an LCD panel is fixed by a holding frame, with a cover glass also being mounted using a frame.

In the above-noted disclosed technology, however, when mounting the LCD panel to a board or the like, the cover glass is also mounted so the same frame. Therefore, unlike the present invention, the disclosed technology does not house and fix the LCD panel between holding members, but rather supports the LCD panel by holding it between rubber connectors, this being a different technical concept from the present invention.

In the Japanese unexamined patent publication No.7-99394, an LCD panel is supported around the periphery by a bezel, with screws provided on the peripheral walls of a box-shaped chassis unit 8, so as to support a liquid-crystal module supported by the bezel.

In the above-noted disclosed technology, however, the mechanism is one in which a liquid-crystal module having an LCD panel 2 is peripherally supported by a bezel (frame 6), with mounting done with receiving members 9 provided at the four corners of at the inner side walls of a box-shaped chassis unit. It is therefore a different technical concept from the present invention.

In the Japanese unexamined patent publication No.9-1466113, there is language describing a display module for the purpose of preventing damage to a an integrated circuit element when a TCP formed by mounting an LSI that drives an LCD panel comes into contact with a conductive shield case.

The above-noted disclosed technology, however, is one in which, in an LCD module in which is housed an LCD panel, and a driving LSI or the like for used within a shield case, a spacer is provided around the periphery of the LCD panel, which is supported at the top and bottom by shield plates. Thus, the purpose is to prevent damage to an integrated circuit element by static electricity, which is a different technical concept than that of the present invention.

In the Japanese unexamined patent publication No.9-315487, there is language describing a housing apparatus in which it is not necessary to have protrusions at the corners of the LCD panel for the purpose of fixing the LCD module, and in which it is possible to avoid damaging an LCD module housing tube or the like, having a compact LCD panel, regardless of the width of a heat sink, and without a reduction in the reliability of the contact with the heat sink.

The above-noted disclosed technology, however, is one whereby an adhesive member is used to fix the housed element, and is a different technical concept from that of the present invention.

In the Japanese unexamined patent publication No.10-70380, there is language describing the a display unit 4 housed on a board, pressure being placed on a holding member 5 around the peripheral edges and a part of the display unit 4 other than the display region housed within the holding member 5, so as to hold the display unit within the holding member, the pressure member being fixed to the holding member in the condition of pressing the display unit.

The above-noted disclosed technology, however, is for eliminating the need for double-sided tape and improving positioning accuracy, while reducing the mounting area and achieving a sufficient backlighting region and display region, so that it does not provide the degree of freedom of design of the present invention.

In the above-noted fixing structures for an LCD panel, the following problem areas. Specifically, the major problem in the prior art is a lack of degree of freedom in design. The reason for this is that, because in the past the fixing structure was joined only with screws or the like, it was necessary to have a design that considered a means to fix the screw positions, thereby making it difficult to achieve a degree of freedom in design. A second problem associated with prior art was that of a large number of manufacturing process steps. The reason for this is that the use of screws and the like results in an increased number of fixing steps.

Accordingly, it is an object of the present invention to improve on the above-noted drawbacks of the past, by improving the degree of freedom in design by improving a holding structure for an LCD panel.

It is a further object of the present invention to decrease the size and weight of an apparatus by simplifying the fixing structure, and yet another object to improve productivity by facilitating the removal of the LCD panel.

SUMMARY OF THE INVENTION

To achieve the above-noted objects, the present invention adopts the following base technical constitution. Specifically, a fixing structure for an LCD panel is a fixing structure that fixes and holds an LCD panel, this LCD panel fixing structure having a first holding member, which holds the LCD panel, and a second holding member, which holds the LCD panel, the LCD panel being housed via a depression formed between the first and second holding members, with only the periphery of the LCD panel fixed and held elastically.

DETAILED DESCRIPTION OF THE PREFERRED EMBODIMENTS

Embodiments of an LCD panel fixing structure according to the present invention are described in detail below, with references made to relevant accompanying drawings.

Figure 1:
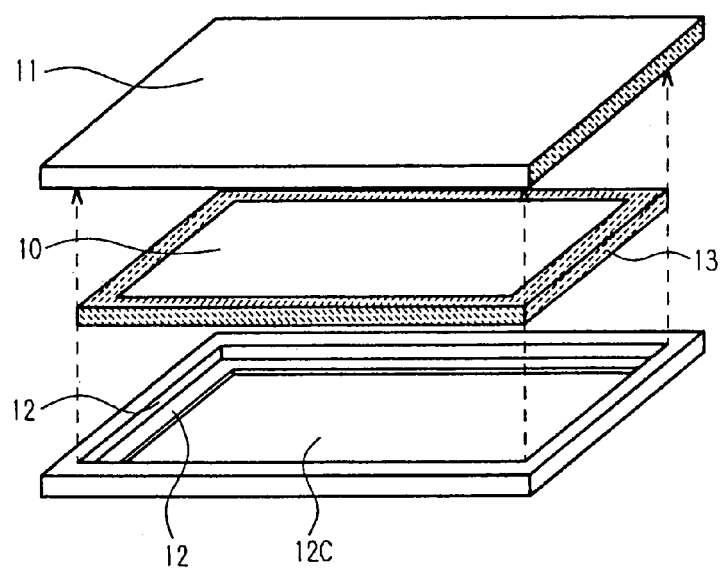
FIG. 1 is an exploded perspective view showing an example of a fixing structure for an LCD panel according to the present invention.
Figure 2:
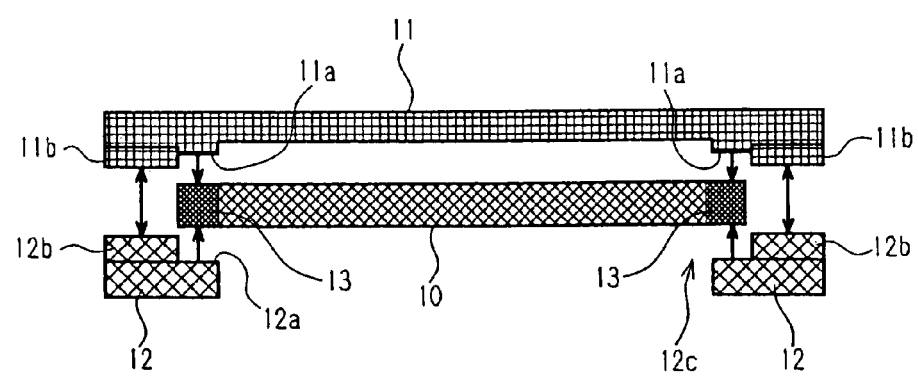
FIG. 2 is a vertical cross-sectional view showing the LCD panel fixing structure of FIG. 1 in the parted condition.

Specifically, FIG. 1 is an exploded perspective view showing an example of an LCD panel fixing structure according to the present invention, and FIG. 2 is a vertical perspective view showing this LCD panel fixing structure in the parted condition. In this embodiment of the present invention, the LCD panel fixing structure is formed by a first holding member 11, which holds the LCD panel 10 and a second holding member 12, which holds the LCD panel 10, the LCD panel being housed, fixed, and held between the first and second holding members 11 and 12.

A depression 11a, which holds an LCD panel edge part 13, is formed in the lower surface of the first holding member 11. A peripheral edge part 11b of the first holding member 11, which is part of the fixing structure, is formed from elastic material so as to enable it to elastically deform. Additionally, the upper surface of the first holding member 11 is flat. The peripheral edge part of the LCD panel 10 serves the function of sealing a liquid crystal that is held between two glass sheets distanced by a prescribed spacing, and a hard material is used to form this edge part, so as to maintain as constant the spacing between the two glass sheets. In the present invention, therefore, even if the first and second holding members press the peripheral edge part 13 with a considerable force from a top or bottom direction thereof, it is possible to maintain the spacing between the two sheets of glass, with no deformation of the edge part 13.

The second holding member 12 has a depression part 12a, which holds the LCD panel peripheral edge part 13, and the peripheral edge part 12b is formed from an elastic material, so as to enable elastic deformation thereof. Additionally, there is a window 12c formed in the center part of the second holding member 12.

Figure 3:
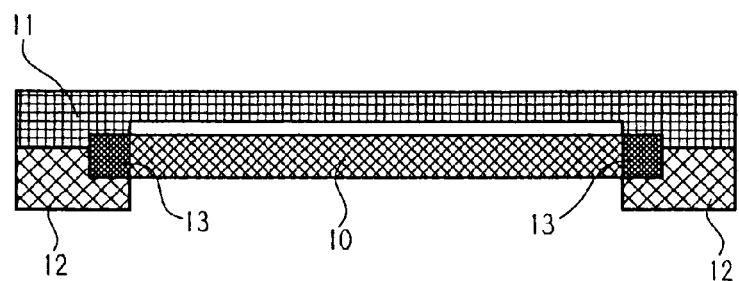
FIG. 3 is a vertical cross-sectional view showing the LCD panel fixing structure in the joined condition.

The assembly of the present invention is described below, with references made to FIG. 2 and FIG. 3. First, the first holding member 11 and second holding member 12 are joined so that the depressed parts are mutually opposite, and so as to surround the LCD panel edge part 13 therebetween, as shown in FIG. 3. Simultaneously, by pressing onto the LCD panel edge part 13, the LCD panel 10 is held and fixed. At least a part of the first holding member 11 and the second holding member 12 which can contact with the peripheral edge part 13 of the LCD are formed of elastic members, so that they can elastically deform.

As noted above, by the surrounding the peripheral edge part of the LCD panel 10 between the depression parts 11a and 12a, respectively, of the first holding member 11 and the second holding member 12, it is possible to fix the LCD panel 10 using the surrounding and grabbing force from the first and second holding members 11 and 12. In the present invention it is possible to hold the LCD panel 10 with the holding member material, without using screws or the like when fixing the LCD panel. Additionally, by imparting stress to the LCD panel edge surface within the elastic deformation limit of the holding member (holding mechanism) material, it is possible to fix the LCD panel.

Figure 4:
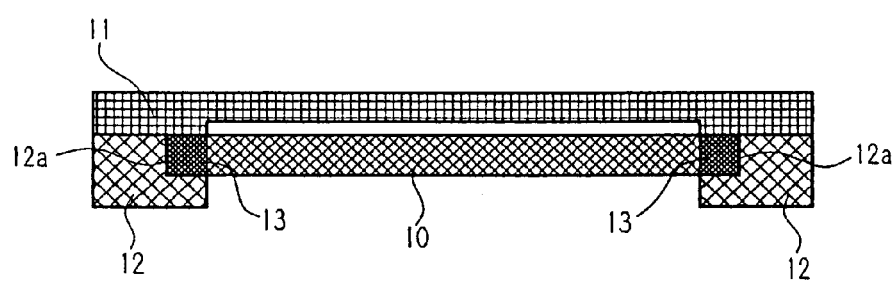
FIG. 4 is a vertical cross-sectional view showing a second embodiment of an LCD panel fixing structure according to the present invention.

FIG. 4 is a vertical perspective view showing a second embodiment of a fixing structure for an LCD panel according to the present invention. In this embodiment of the present invention, the depression part 12a is formed only in the peripheral part of a bar-shaped second holding member 12, no depression part being formed in the first holding member 11 for the purpose of holding the LCD panel 10. It is thus possible to reduce the thickness of the first holding member 11.

Figure 5:
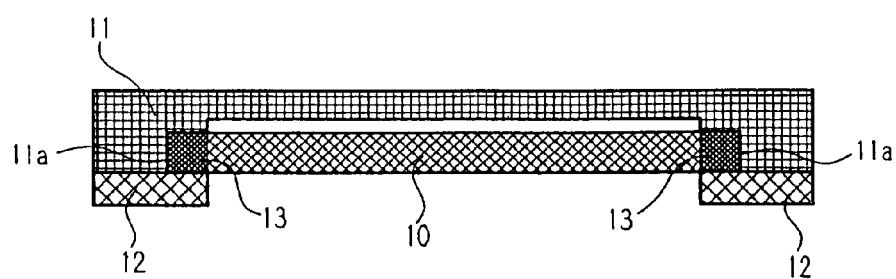
FIG. 5 is a vertical cross-sectional view showing a third embodiment of an LCD panel fixing structure according to the present invention.

FIG. 5 is a vertical perspective view showing a third embodiment of an LCD panel fixing structure according to the present invention. In this embodiment of the present invention, the depression part 11a is formed only in the peripheral part of a bar-shaped second holding member 11, no depression part being formed in the second holding member 12 for the purpose of holding the LCD panel 10. It is thus possible to reduce the thickness of the second holding member 12.

Of course, in the present invention, the first and the second holding members 11 and 12 are fixed to each other with a suitable holding means such as a clamping means a clipping means, a grasping means or the like, except for a screw member.

It will be understood that the present invention is not limited to the above-described embodiments, and can take on a numerous variations, within the technical scope of the present invention.

By adopting the above-described technical constitution, the present invention achieves a number of effects.

The first effect achieved by the present invention is an enhancement in the degree of design freedom with regard to the LCD panel fixing location in equipment such as an LCD monitor, a notebook-type personal computer, and an all-in-one type personal computer or the like, in which it is necessary to fix an LCD panel.

The reason for this is that, because there is no need to fix the LCD panel using screws and the like, locations of LCD panel fixing screws need not be considered in the design process.

The second effect achieved by the present invention is a facilitating of operations on the LCD panel fixing part, because there is no need to fix the LCD panel using screws during production.

The reason for this is that it is possible to fix the LCD panel using only a holding member.

What is claimed is:

1. An LCD panel fixing structure for fixing and holding an LCD panel, comprising:
   a first holding member; and
   a separate and distinct second holding member for engaging the first holding member to hold an LCD panel therebetween,
   wherein only one of the first holding member and the second holding member includes a depression for engaging a peripheral edge of an LCD panel to hold the LCD panel therebetween, and
   wherein a portion of at least one of the first and second holding members that engages the other of the first and second holding members is comprised of an elastically deformable material.

2. An LCD panel fixing structure according to claim 1, wherein said second holding member is frame shaped, and comprises said depression at an inner periphery thereof for engaging a peripheral edge of an LCD panel held therebetween.

3. An LCD panel fixing structure according to claim 1, wherein at least one of said first and second holding members has a structure that does not cause said LCD panel to deform when subjected to pressure.

4. An LCD panel fixing structure according to claim 1, wherein a portion of said only one of said first and second holding members in which said depression is provided is formed of said elastically deformable material.

5. An LCD panel fixing structure according to claim 1, wherein all of at least one of said first and second holding members is formed of said elastically deformable material.

6. An LCD panel fixing structure according to claim 1, wherein all of both said first and second holding members is made of said elastically deformable material.

7. An LCD panel fixing structure according to claim 1, wherein said first and second holding members are fixed to each other with a holding member that is not a screw.

* * * * *